United States Patent
Goddard et al.

(10) Patent No.: US 9,367,276 B2
(45) Date of Patent: Jun. 14, 2016

(54) RESOLUTION OF CONFLICTS BETWEEN PRINT JOBS AND PRINTERS IN A PRINT SHOP ENVIRONMENT

(75) Inventors: Joan Stagaman Goddard, Boulder, CO (US); Cosmin Andrei Grosan, Timisoara (RO); Kumar V. Kadiyala, Boulder, CO (US)

(73) Assignee: Ricoh Company, Ltd., Tokyo (JP)

(*) Notice: Subject to any disclaimer, the term of this patent is extended or adjusted under 35 U.S.C. 154(b) by 814 days.

(21) Appl. No.: 13/032,822

(22) Filed: Feb. 23, 2011

(65) Prior Publication Data

US 2012/0212771 A1    Aug. 23, 2012

(51) Int. Cl.
*G06F 3/12* (2006.01)

(52) U.S. Cl.
CPC .............. *G06F 3/1288* (2013.01); *G06F 3/121* (2013.01); *G06F 3/1204* (2013.01); *G06F 3/1205* (2013.01); *G06F 3/126* (2013.01); *G06F 3/1253* (2013.01); *G06F 3/1255* (2013.01); *G06F 3/1261* (2013.01); *G06F 3/1229* (2013.01); *G06F 3/1237* (2013.01); *G06F 3/1262* (2013.01); *G06F 3/1263* (2013.01); *G06F 3/1264* (2013.01)

(58) Field of Classification Search
CPC ... G06F 3/1261; G06F 3/1262; G06F 3/1263; G06F 3/1264
See application file for complete search history.

(56) References Cited

U.S. PATENT DOCUMENTS

| | | | |
|---|---|---|---|
| 2003/0016374 A1* | 1/2003 | Christodoulou et al. | 358/1.12 |
| 2004/0042033 A1* | 3/2004 | Sesek et al. | 358/1.15 |
| 2004/0099166 A1* | 5/2004 | Blom et al. | 101/483 |
| 2006/0149755 A1* | 7/2006 | Marshall | B43M 3/04 |
| 2006/0227363 A1* | 10/2006 | Ogura | G06F 3/1261 358/1.15 |
| 2009/0138878 A1* | 5/2009 | Fernstrom et al. | 718/102 |

FOREIGN PATENT DOCUMENTS

GB      2376330 A      12/2002

* cited by examiner

*Primary Examiner* — King Poon
*Assistant Examiner* — Vincent Peren
(74) *Attorney, Agent, or Firm* — Duft Bornsen & Fettig LLP (57) ABSTRACT

Systems and methods for identifying conflicts between the requirements of an incoming print job and the configuration of a printer that has been requested to print the job. The system receives a request to move a print job to a queue for a printer and identifies a requirement of the print job. The system analyzes a current and a scheduled configuration of the printer to determine whether the current configuration or the scheduled configuration of the printer can handle the print setting. Responsive to determining that the current and scheduled configuration of the printer cannot handle the print setting, the system analyzes configurations of at least one other printer to identify another printer having a current configuration or a scheduled configuration that can handle the print setting. Further, the system provides information identifying the other printer.

20 Claims, 7 Drawing Sheets

RESOLUTION OF CONFLICTS BETWEEN PRINT JOBS AND PRINTERS IN A PRINT SHOP ENVIRONMENT

FIELD OF THE INVENTION

The invention relates to the field of print job management, and in particular, to resolving conflicts between print jobs and printers.

BACKGROUND

Print shops are typically medium or large scale facilities capable of supplying printing services to meet a variety of customer demands. For example, print shops are often used to print documents used for mass-mailing (e.g., customer bills, advertisements, etc). Because print shops engage in printing on a scale that is hard to match, their customer base is usually varied. Print shop clients may therefore include both large institutional clients (e.g., credit card companies and banks), and small clients (e.g., small businesses and churches).

Print shops are generally arranged to print incoming jobs from clients in a way that is economical, yet fast. Thus, print shops often include a number of high-volume printers capable of printing incoming jobs quickly and at high quality. Print shops also typically include post-processing devices that are used to process the printed documents of each job (e.g., stackers, staplers, cutters, binders, etc.). Because print shops serve a variety of clients, they are often tasked with printing jobs that have varying printing formats, delivery dates, and media requirements. Print shops therefore often use a centralized print server that coordinates activity between printers of the print shop and clients. The print server schedules incoming jobs and forwards them to the printers they are directed to.

Printers of a print shop may be managed by operators who set up the printers and schedule jobs to queues for the printers. Unfortunately, user error by a print operator remains a problem during the scheduling of print jobs at a print server. In particular, a print operator may attempt to schedule a print job to a queue for a printer that is not properly configured to print the incoming job (e.g., the printer may not have the type of media that is required by the print job). If a print job reaches the front of a queue for a printer that is not properly configured, the printer may either misprint the print job, or detect an error and halt printing, thereby delaying the workflow of the print shop. Thus, it remains a problem for print operators to properly schedule jobs on printers.

SUMMARY

Embodiments described herein identify and resolve conflicts between the requirements of a print job and the configuration of a printer that has been requested to print the job. When a print server receives a request to schedule a print job at a queue for a printer, it determines whether a current or future configuration of the printer will be able to print the print job. If the current and the scheduled configuration of the printer are not capable of printing the job, the system analyzes configurations of other printers to find a printer having a configuration that is capable of printing the job. Upon making this determination, the print server provides information identifying the printer. Thus, the print server is capable of detecting and correcting user errors that occur when print operators attempt to schedule print jobs within the print shop.

One embodiment is a print server that identifies conflicts between the requirements of an incoming print job and the configuration of a printer that has been requested to print the job. The print server includes an interface system that receives a request to move a print job to a queue for a printer. The print server also includes a control system that analyzes a current and a scheduled configuration of the printer and the print setting to determine whether the current configuration or the scheduled configuration of the printer can handle the print setting, and responsive to determining that the current and scheduled configuration of the printer cannot handle the print setting, analyzes configurations of at least one other printer to identify another printer having a current configuration or a scheduled configuration that can handle the print setting, and provides information identifying the other printer.

In another embodiment, the print server is further capable of identifying where the incoming print job can be placed in the queue for the other printer. In this embodiment, the control system receives input selecting the other printer, and responsive to receiving the input, identifies available locations in a queue for the other printer where the other printer can handle the print setting. The control system provides information identifying the available locations in the queue for the other printer, and moves the print job to an available location in the queue for the other printer.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
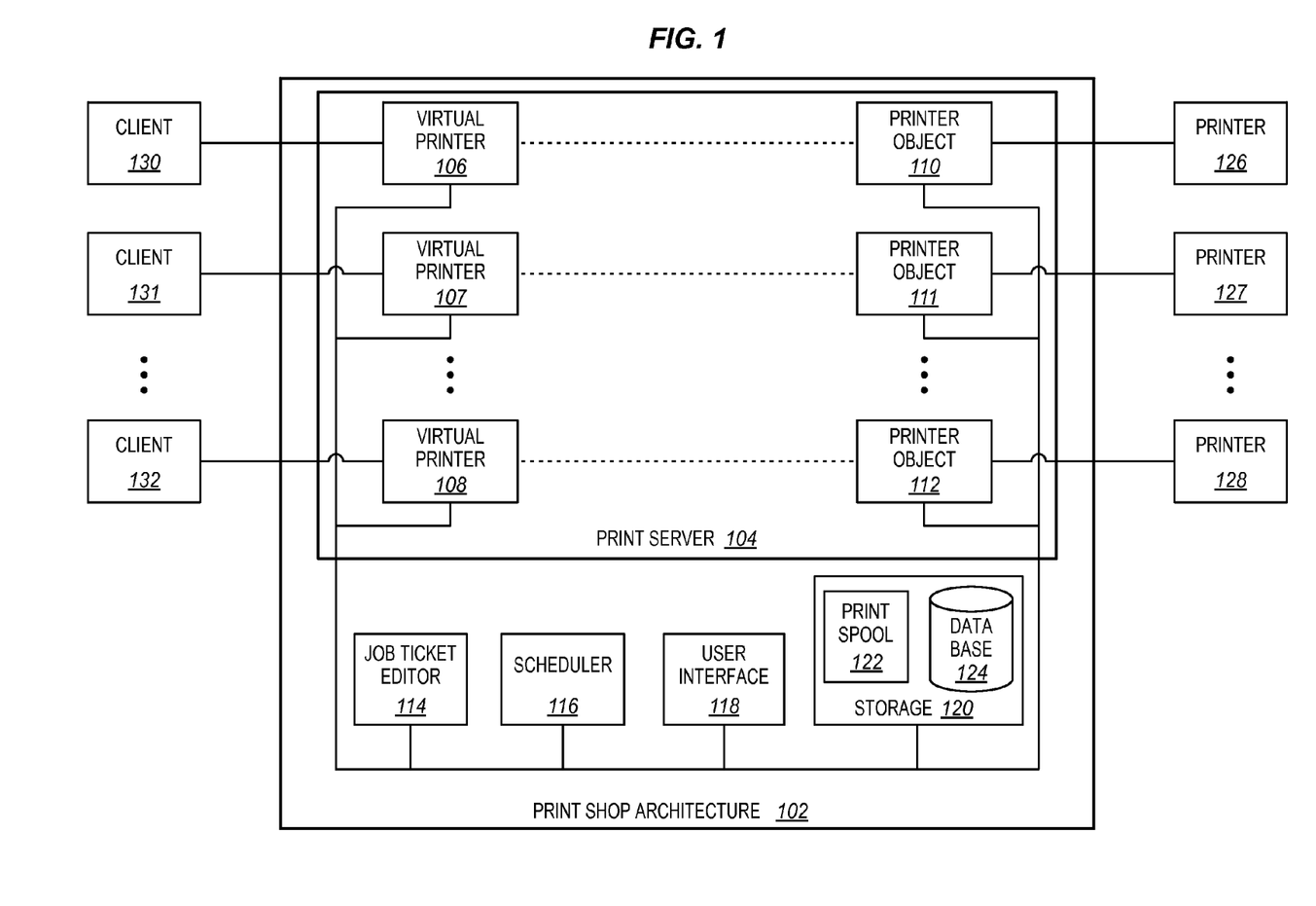
FIG. 1 is a block diagram illustrating a print shop architecture in an exemplary embodiment.

FIG. 1 is a block diagram illustrating a print shop architecture 102 in an exemplary embodiment. Print shop architecture 102 couples one or more clients 130-132 to one or more printers 126-128 to provide printing and print workflow services to clients 130-132. Print shop architecture 102 is operable to receive print jobs and job tickets from clients 130-132 for printing on printers 126-128. Clients 130-132 may include banks, credit card companies, or other entities with printing needs (e.g., monthly bank statements, monthly credit card bills, etc.). Print shop architecture 102 may receive print jobs from clients 130-132 in a number of different formats, such as Portable Document Format (PDF), Mixed Object: Document Content Architecture (MO:DCA), etc. Job tickets may be received from clients 130-132 in a number of different formats, such as Job Definition Format (JDF), Print Production Format (PPF), Portable Job Ticket Format (PJTF), etc. Printers 126-128 generally include systems for transforming print data onto a suitable printable medium, such as paper, and generally are large production printing systems for high volume printing.

Print shop architecture 102 includes a print server 104 having one or more virtual printers 106-108. Virtual printers 106-108 communicate with clients 130-132 and provide an interface similar to a printer driver to allow clients 130-132 to set up print jobs and send print jobs (and job tickets associated with the print jobs) to print shop architecture 102. When clients 130-132 send print jobs and job tickets to print shop architecture 102, the job tickets are scanned into a database 124 located in storage 120 of print shop architecture 102. The print jobs are then stored in a print spool 122 of storage 120 as open jobs prior to queuing the print jobs for printing. A scheduler 116 identifies the open jobs located in print spool 122 and attempts to schedule the jobs at a queue of one or more printer objects 110-112. Typically, scheduler 116 attempts to schedule the open jobs at one of printer objects 110-112 corresponding with virtual printers 106-108 that received the print job. For example, if client 130 transmitted the print job to virtual printer 106, then scheduler 116 may first attempt to place the print job at a print queue of printer object 110. Generally, printer objects 110-112 interface with corresponding printers 126-128 to queue and process print jobs prior to transmitting the jobs to printers 126-128.

A print operator may use a user interface 118 of print shop architecture 102 to control and identify the status of jobs at print shop architecture 102. For example, user interface 118 may provide a list of print jobs in queues of printer objects 110-112 and other general information about the status of open jobs in print spool 122.

The print operator may also use a job ticket editor 114 to modify job tickets associated with both open and queued print jobs. Using job ticket editor 114, the printer operator may modify job tickets to change various print options for a print job associated with the job ticket, such as duplexing, stapling, media type, etc.

Print shop architecture 102 provides a number of printing and workflow services to clients 130-132 which will become more readily apparent through the following discussion and related figures. FIGS. 2-5 will discuss embodiments of print shop architectures that are able to detect whether a requested printer is capable of printing an incoming job, and to identify printers that are capable of printing the incoming job if the requested printer is unable to print it.

Figure 2:
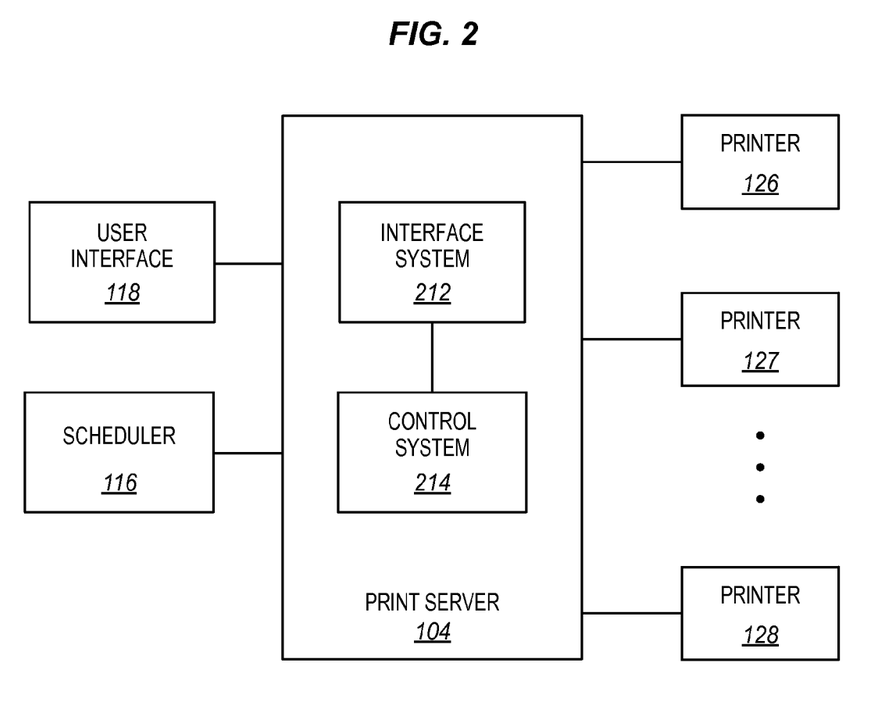
FIG. 2 is a block diagram of a print server in an exemplary embodiment.

FIG. 2 is a block diagram of a print server 104 in an exemplary embodiment. In this embodiment, print server 104 comprises interface system 212 and control system 214 in communication with user interface 118 and scheduler 116. Control system 214 analyzes incoming print jobs, and determines whether a conflict exists between the printing requirements of the print jobs ("print settings") and the configurations of the requested printers (e.g., the type of media and/or ink that is currently loaded at these printers or scheduled to be loaded at these printers).

Further details of the operation of print server 104 will be discussed with regard to FIG. 3. Assume, for this embodiment, that a client sends a print job to a print operator, and that the print operator attempts to schedule the print job via user interface 118. Print server 104 detects a conflict between a print setting of the print job and the scheduled configuration of the requested printer, and helps to resolve the conflict by providing the print operator with a "wizard" indicating available printers in the print shop that do not conflict with the print setting of the print job.

Figure 3:
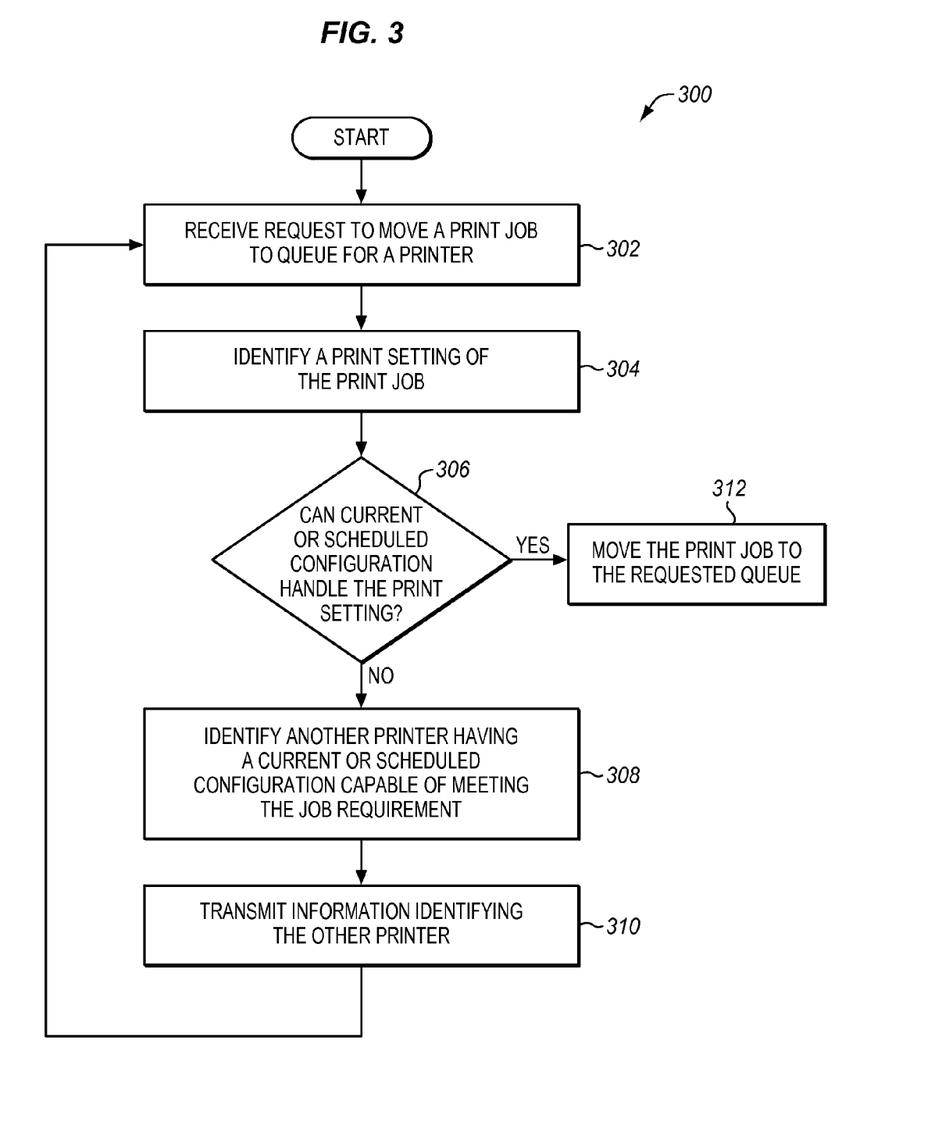
FIG. 3 is a flowchart illustrating a method for resolving conflicts between print jobs and printers in an exemplary embodiment.

FIG. 3 is a flowchart illustrating a method 300 for resolving conflicts between print jobs and printers in an exemplary embodiment. The steps of method 300 are described with reference to print server 104 of FIG. 2, but those skilled in the art will appreciate that method 300 may be performed in other systems. The steps of the flowcharts described herein are not all inclusive and may include other steps not shown. The steps described herein may also be performed in an alternative order.

In step 302, interface system 212 receives a request to move a print job to a queue for a printer (the "requested printer"). The request may be received from user interface 118 or scheduler 116. In one embodiment, the request is included with a job ticket having metadata that identifies the requested printer.

In step 304, control system 214 identifies a requirement of the print job ("print setting"). A print setting comprises information that describes how the print job will be printed. A print setting may comprise information describing the type of media or ink used to print the print job (e.g., A4 paper and color ink), the number of pages of paper used to print the print job, a particular type of processing algorithm desired to rasterize the print job, and others. In one embodiment, a print setting comprises a name of a print shop customer associated with the print job, a post-print processing setting of the print job (e.g., stack, staple, sort, bind, etc.), an output tray desired for the print job, or a size of the print job (e.g., a number of pages or amount of ink used by the print job). A print setting may be identified by control system 214 when it reads metadata associated with the print job that expressly indicates print settings (e.g., job ticket information for the print job), or may be identified by control system 214 parsing the print job to determine the media and ink used for the print job. In one embodiment, control system 214 performs a pre-rasterization step to identify properties of the print job.

In step 306, control system 214 determines whether the current configuration or a scheduled configuration of the requested printer can handle the print settings of the print job. A "configuration" of a printer may comprise the type or amount of media and/or ink loaded at the printer, the version of software running on the printer, the model number of the printer, functional components of the printer that are used in the printing process, and others. Scheduled configurations are configurations for a printer that are scheduled to be implemented in the future. Control system 214 may determine the current configuration of the requested printer by parsing information stored on print server 104 describing the requested printer, or by querying the printer itself.

In one embodiment, print queues for printers 126-128 comprise not only print jobs, but also pseudo jobs. A pseudo job is a special type of non-printing job that is added to a print queue. The pseudo job may define a boundary in the print queue, such as a boundary between A4 print jobs and letter print jobs. For example, the print operator may schedule A4 print jobs to the print queue, add in a pseudo job to define a boundary in the print queue between A4 jobs and letter jobs, and schedule letter jobs after the pseudo job. A pseudo job may therefore define a scheduled change to a configuration of a printer, such as changes in media loaded at the printer for printing jobs, the type of post-print activities available at the printer (stapling, binding, etc.), a type of toner available at the printer, a type of print engine available at the printer, and a type of firmware installed at the printer. For example, a print operator may schedule A4 print jobs to a print queue of the printer, add in a pseudo job to define a scheduled media change to letter paper at the printer, and schedule letter jobs after the pseudo job. Using pseudo jobs, a print operator has more flexibility in scheduling multiple types of print jobs for a printer.

Control system 214 may determine whether a configuration of the printer can handle the print setting by comparing the configuration of the printer to the requirements of the print job. Each configuration of the printer may be analyzed to determine whether it complies with the print setting of the print job. If no current or scheduled configuration of the printer can handle the print settings of the print job, control system 214 continues onward to step 310. Alternatively, if a current or scheduled configuration of the requested printer can handle the print settings of the print job, then control system 214 is operable to direct scheduler 116 to move the print job to the requested queue, at step 312.

In one embodiment, control system 214 makes its determination based upon configurations of the requested printer across a specific period of time. For example, control system 214 may analyze the next twenty-four hours of changes to the printer's configuration, or may analyze the next three changes to the printer's configuration. This may be desirable when a print operator wishes to print the print job within a certain time frame.

In a further embodiment, upon determining that the requested printer does not have a current or scheduled configuration that can handle the print settings of the print job, control system 214 displays information indicating that the print job will not be moved to the requested printer. This information may constitute an error message indicating that the requested printer is not capable of printing the print job.

In step 308, control system 214 identifies another printer having a current or scheduled configuration capable of meeting the print settings of the print job. Control system 214 may identify the other printer by acquiring configuration information for the printers that are managed by print server 104, and engaging in a process similar to step 308 described above. In one embodiment to maximize the speed of this process, control system 214 may search until it finds the first printer having a configuration that can handle the print settings of the print job. In an alternate embodiment, control system 214 may identify each other printer having a configuration that can handle the print settings of the print job.

In step 310, control system 214 provides information identifying the other printer(s) to at least one of user interface 118 or scheduler 116. The information may be provided as a display via user interface 118, or may be provided to scheduler 116 for automatic rescheduling of the print job. The information may be displayed as a list that identifies the printers, or may comprise further information such as an anticipated printing time at the printer, a description of printer capabilities, etc. Further, the information provided by control system 214 may be displayed at user interface 118 as a menu, allowing the user to move the job to a queue for one of the other printers identified by control system 214 in step 310.

Utilizing the method 300 of FIG. 3, it is possible to prevent situations wherein a print job is unintentionally scheduled at a printer that is incapable of printing the job. By identifying conflicts between the scheduled configurations of a requested printer and the requirements of an incoming print job, and by presenting an option to the user to resolve the conflict by assigning the print job to a different printer, method 300 eliminates the risk that a print job will be scheduled at a printer that is incapable of printing the job, thereby halting or delaying the workflow of the print shop.

Furthermore, one of ordinary skill in the art will appreciate that the same techniques discussed above with regard to conflict resolution for a single print job can be applied to groups of print jobs. In this manner, if an entire group of print jobs having similar print settings encounter a conflict, they can all be moved at once. For example, a user can send a request to schedule a group of print jobs at the same time. Control system 214 is operable to detect the print settings of the group of print jobs (i.e., the requirements or settings for each job in the group) and engage in the steps of method 300 to determine a printer that can meet all of the requirements of the group of print jobs. In one embodiment, only print jobs in the group that have conflicting print settings are rescheduled to a different printer than the requested printer.

Figure 4:
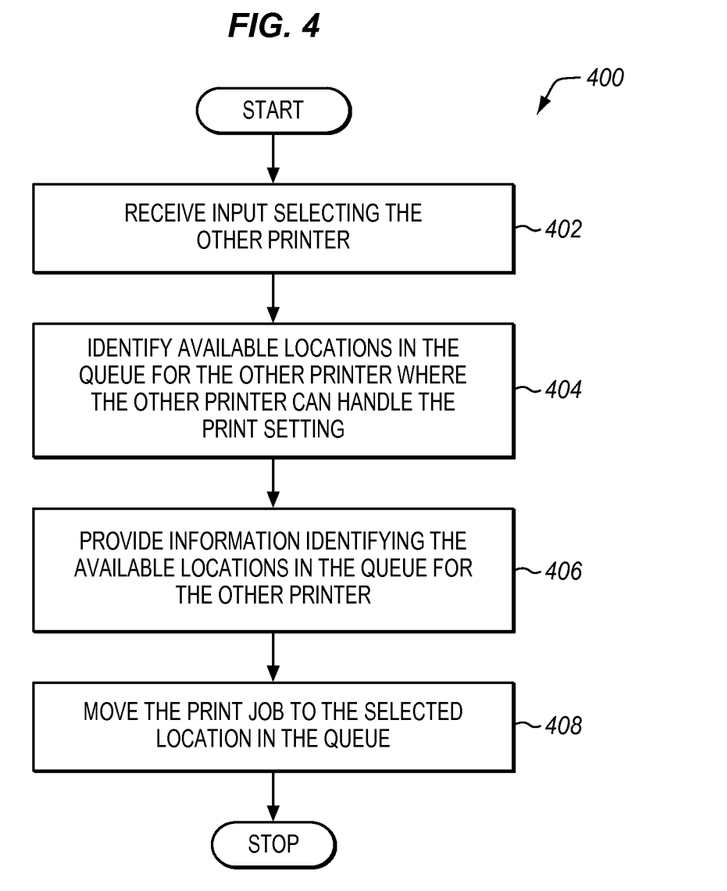
FIG. 4 is a flowchart illustrating additional details for resolving conflicts between print jobs and printers in an exemplary embodiment.

FIG. 4 is a flowchart illustrating additional details for resolving conflicts between print jobs and requested printers in an exemplary embodiment. In particular, method 400 of FIG. 4 illustrates additional steps that may be taken to ensure that an incoming print job is properly scheduled after a compatible printer has been chosen.

In step 402, control system 214 receives input selecting the other printer. In step 404, responsive to receiving the input, control system 214 identifies available locations in the queue for the other printer. Available locations are locations within the queue where the configuration of the printer can handle the print settings of the print job. In embodiments where changes to a printer's configuration are indicated with pseudo jobs at a queue for the printer, control system 214 may identify specific locations in the queue where the print job may be moved. For example, control system 214 may parse the print queue to find pseudo jobs that meet the requirements of the print job. The print job may then be placed between print jobs in the queue that follow the qualifying pseudo job.

In step 406, control system 214 provides information identifying the available locations in the queue. This information may comprise address pointers to the queue itself, or may comprise other information uniquely identifying available queue locations. This information may be displayed at user interface 118, or may be provided to scheduler 116 for scheduling feedback.

In step 408, control system 214 directs scheduler 116 to move the print job to the selected location in the queue. Moving the print job may comprise modifying a job ticket associated with the print job, or may comprise changing the location of the print job itself in memory. The decision to move the print job may be based upon feedback from scheduler 116, or may be based upon user input received via user interface 118.

Examples

Figure 5:
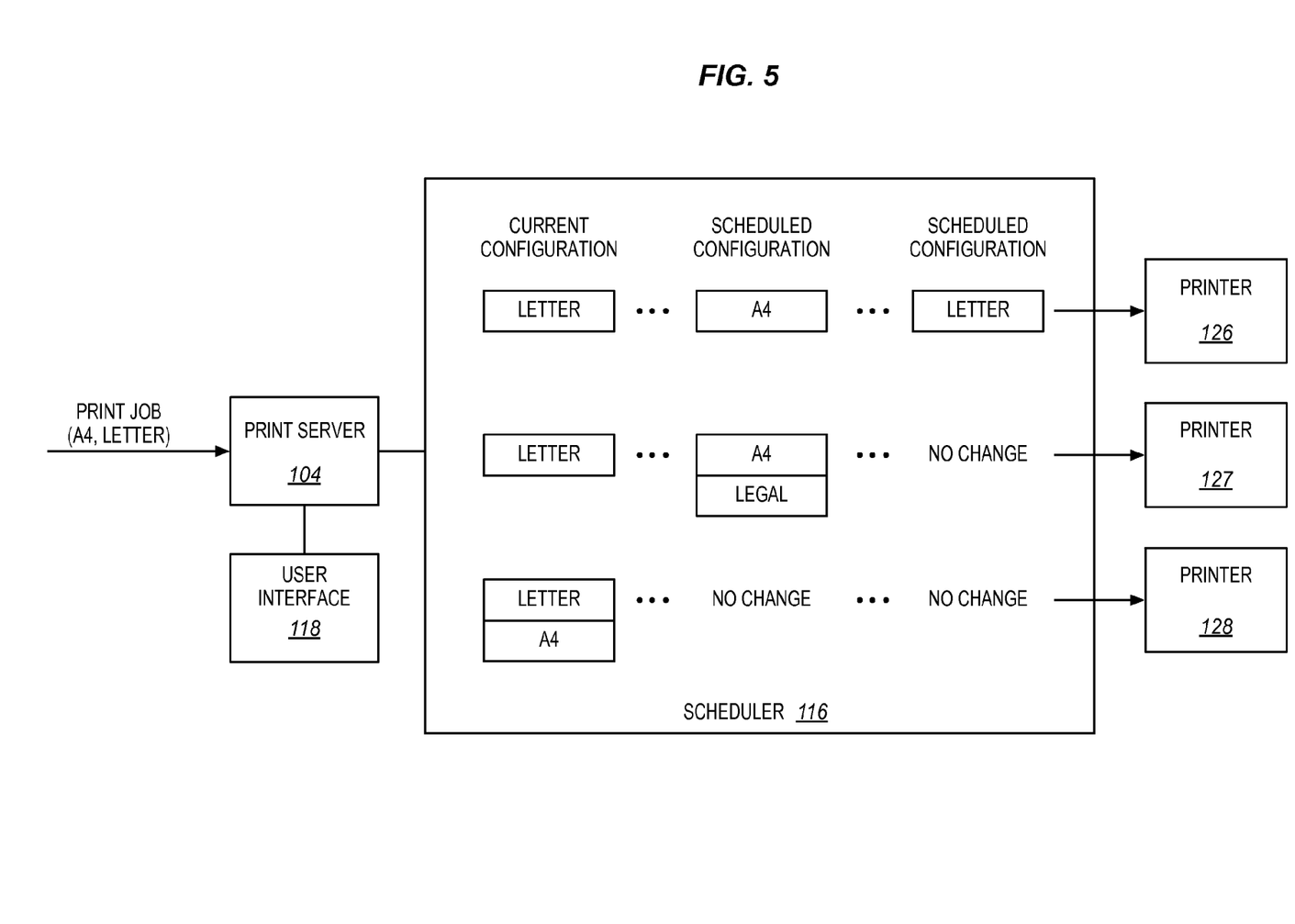
FIG. 5 illustrates an example of a print server implementing the method of FIG. 3.

FIG. 5 illustrates an example of a print server 104 implementing the method of FIG. 3. In this example, additional processes, systems, and methods are described in the context of print server 104 detecting and resolving conflicts between the requirements of a print job and the current and scheduled configurations of printers 126-128.

In this embodiment, print server 104 receives a print job and a request to assign the print job to printer 126. Print server 104 parses job ticket information for the print job, and identifies that the print job uses A4 paper and letter paper. Print server 104 therefore determines that the print settings for the print job are that A4 paper and letter paper both be available at the same time. The current configuration of printer 126 is then analyzed by querying scheduler 116. The current configuration of printer 126 indicates that printer 126 only has letter paper currently available. Print server 104 then analyzes the scheduled configurations of printer 126 by parsing a series of pseudo jobs in the print queue for printer 126. These pseudo jobs exist within the print queue, and may be placed between print jobs in the queue and indicate scheduled changes of media at the printer. Two pseudo jobs exist in the print queue for printer 126. The first pseudo job indicates a change from letter paper to A4 paper, and the second media change indicates a change from A4 paper to letter paper. Thus, print server 104 determines that no current or scheduled configuration of printer 126 is capable of printing the print job, because none of these configurations have both A4 and letter paper available at the same time.

Print server 104 thus proceeds to search for a printer that will have a configuration matching the requirements of the print job. Printer 127 is identified, and a determination is made that printer 127 has a current configuration wherein letter paper is available, and a scheduled configuration wherein A4 paper and legal paper is available. Print server 104 discards printer 127 as a candidate, and proceeds to analyze printer 128. Printer 128 has one configuration, where letter paper and A4 paper are loaded. This configuration matches the print settings for the print job. Print server 104 therefore displays information at user interface 118, indicating that printer 126 is incapable of printing the print job, but printer 128 is available. A user receives the information, and selects printer 128 for printing. Print server 104 receives the scheduling selection from the user, and forwards this information to scheduler 116. Scheduler 116 then schedules the print job for printing at printer 128.

Figure 6A:
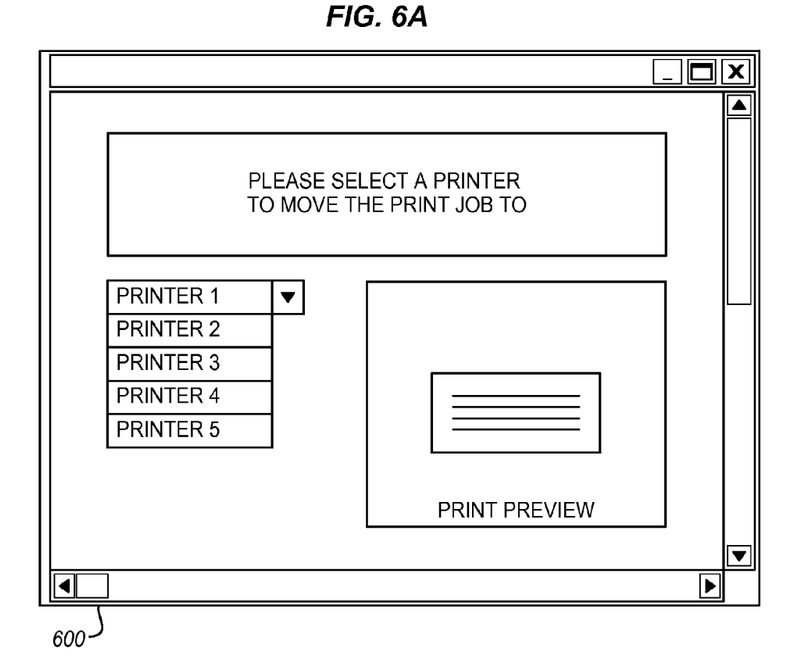
FIGS. 6A-6B illustrate a further example of a print server implementing the method of FIG. 3.
Figure 6B:
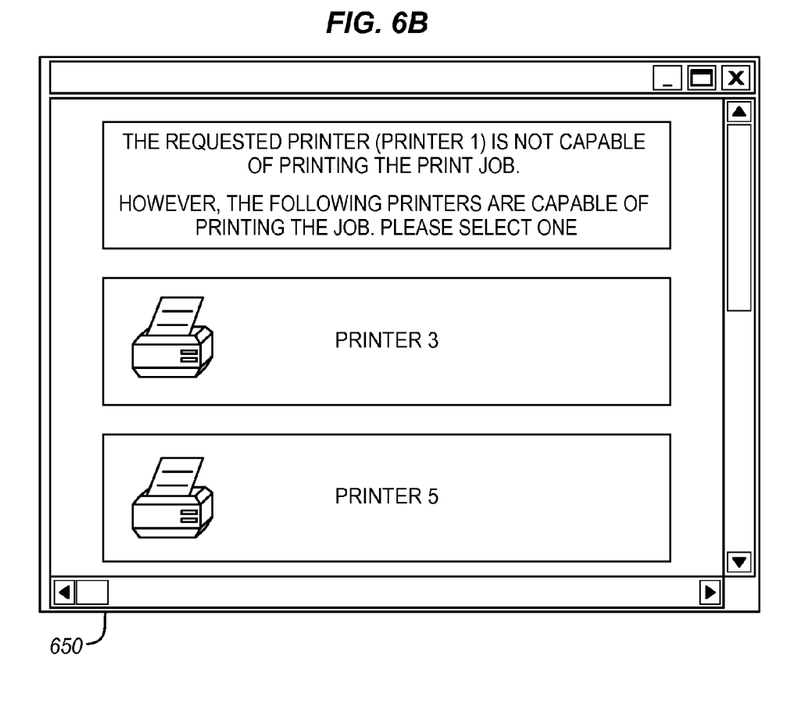

FIGS. 6A-6B illustrate a further example of a print server 104 implementing the method of FIG. 3. In particular, these figures illustrate a user's perspective of an embodiment of the invention. Dialogue window 600 of FIG. 6A illustrates a software window comprising a prompt providing a suggestion to the user ("please select a printer . . . "), a drop-down menu allowing for re-assignment of a print job, and a print preview window illustrating a print preview for the print job. When the user attempts to schedule the print job to an improper printer (e.g., printer 1) using the drop down scheduling menu, print server 104 displays dialogue window 650 of FIG. 6B. At dialogue window 650, the user receives input indicating that the print job cannot be printed at the requested printer. In order to aid the user in selecting a printer that can properly print the job, a list of available printers is displayed for the user to select. Dialogue windows 600 and 650 may be implemented, for example, at user interface 118.

Figure 7:
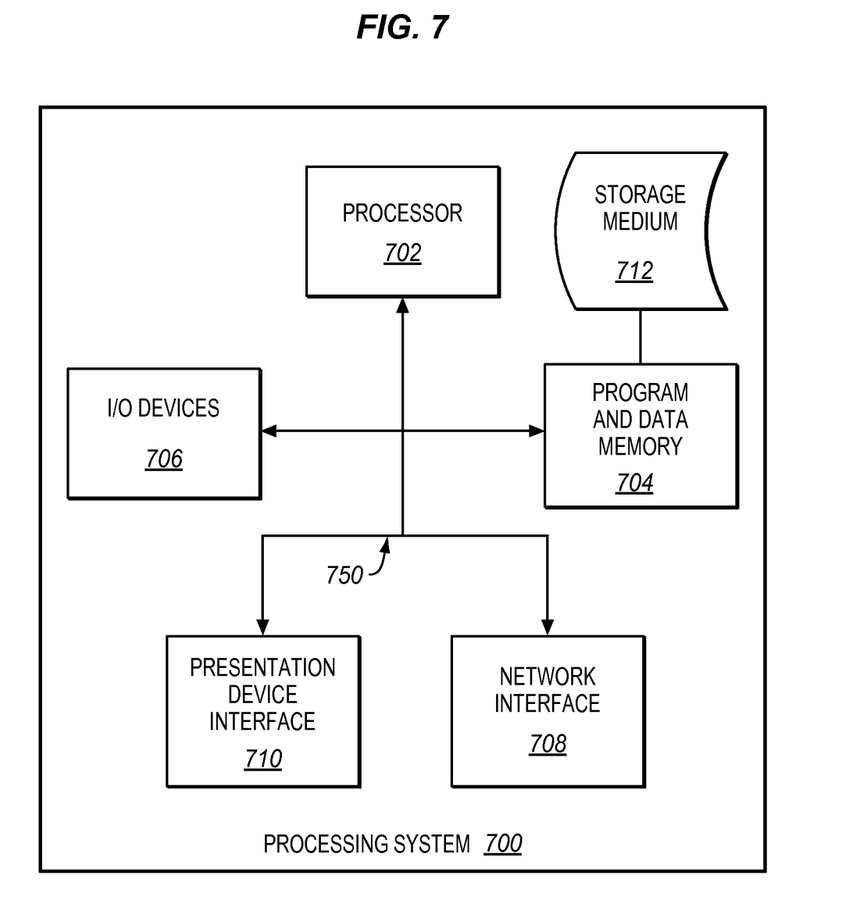
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print server 104 to perform the various operations disclosed herein. FIG. 7 illustrates a processing system operable to execute a computer readable medium embodying programmed instructions to perform desired functions in an exemplary embodiment. Processing system 700 is operable to perform the above operations by executing programmed instructions tangibly embodied on a computer readable storage medium 712. In this regard, embodiments of the invention can take the form of a computer program accessible via the computer-readable medium 712 providing program code for use by a computer or any other instruction execution system. For the purposes of this description, a computer readable storage medium 712 can be anything that can contain or store the program for use by the computer.

The computer readable storage medium 712 can be an electronic, magnetic, optical, electromagnetic, infrared, or semiconductor device. Examples of the computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 700, being suitable for storing and/or executing the program code, includes at least one processor 702 coupled to memory elements 704 through a system bus 750. The memory elements 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc) can be coupled to the system either directly or through intervening I/O controllers. Network adapter interfaces 708 may also be coupled to the system to enable the processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 710 may be coupled to the system to interface to one or more presentation devices, such as printing systems and displays for presentation of presentation data generated by processor 702.

Although specific embodiments were described herein, the scope of the invention is not limited to those specific embodiments. The scope of the invention is defined by the following claims and any equivalents thereof.

We claim:

1. A print server comprising:
an interface system that receives a request to move a print job to a queue for a printer wherein the printer includes multiple scheduled configurations across a period of time; and
a control system that identifies a print setting of the print job, analyzes each scheduled configuration of the printer across the period of time to determine whether any of the scheduled configurations can handle the print setting, and responsive to determining that the scheduled configurations of the printer cannot handle the print setting, analyzes configurations of one or more other printers to identify another printer having a configuration that can handle the print setting during the period of time, and provides information identifying the other printer
wherein the control system analyzes the scheduled configurations by determining a version of software running on the printer.

2. The print server of claim 1, wherein:
the control system is further operable to present a user interface enabling a user to move the print job to a queue of the other printer.

3. The print server of claim 1, wherein:
the control system further identifies each printer managed by the print server that has a configuration that can handle the print setting, and provides information identifying each of the managed printers that can handle the print setting.

4. The print server of claim 3, wherein:
the information identifying each of the managed printers that can handle the print setting is presented to a user at a display device.

5. The print server of claim 1, wherein:
the print setting comprises at least one of a customer name of the print job or an output tray of the print job.

6. The print server of claim 1, wherein:
the control system analyzes the scheduled configurations by further determining a model number for the printer.

7. The print server of claim 1, wherein:
the control system further receives input selecting the other printer, and responsive to receiving the input, identifies available locations in a queue for the other printer where other printer can handle the print setting, provides information identifying the available locations in the queue for the other printer, and moves the print job to an available location in the queue for the other printer.

8. A method comprising:
receiving a request to move a print job to a queue for a printer wherein the printer includes multiple scheduled configurations across a period of time;
identifying a print setting of the print job;
analyzing, via a processor, each scheduled configuration of the printer across the period of time to determine whether any of the scheduled configurations can handle the print setting;
analyzing, via a processor, responsive to determining that the scheduled configurations of the printer cannot handle the print setting, configurations of one or more other printers to identify another printer having a configuration that can handle the print setting during the period of time, wherein analyzing the scheduled configurations comprises determining a version of software running on the printer; and
providing information identifying the other printer.

9. The method of claim 8, wherein:
providing information identifying the other printer comprises presenting a user interface enabling a user to move the print job to a queue of the other printer.

10. The method of claim 8, further comprising:
identifying each printer managed by a print server that has a configuration that can handle the print setting; and
providing information identifying each of the managed printers that can handle the print setting.

11. The method of claim 10, further comprising:
presenting the information identifying each of the managed printers that can handle the print setting to a user at a display device.

12. The method of claim 8, wherein:
the print setting comprises at least one of a customer name of the print job or an output tray of the print job.

13. The method of claim 8, wherein:
analyzing the scheduled configurations further comprises determining a model number for the printer.

14. The method of claim 8, further comprising:
receiving input selecting the other printer;
responsive to receiving the input, identifying available locations in a queue for the other printer where the other printer can handle the print setting;
providing information identifying the available locations in the queue for the other printer; and
moving the print job to an available location in the queue for the other printer.

15. A non-transitory computer readable medium embodying programmed instructions which, when executed by a processor, are operable for performing a method, the method comprising:
receiving a request to move a print job to a queue for a printer wherein the printer includes multiple scheduled configurations across a period of time;
identifying a print setting of the print job;
analyzing each scheduled configuration of the printer across the period of time to determine whether any of the scheduled configurations can handle the print setting;
analyzing, responsive to determining that the scheduled configurations of the printer cannot handle the print setting, configurations of one or more other printers to identify another printer having a configuration that can handle the print setting during the period of time, wherein analyzing the scheduled configurations comprises determining a version of software running on the printer; and
providing information identifying the other printer.

16. The computer readable medium of claim 15, wherein:
providing information identifying the other printer comprises presenting a user interface enabling a user to move the print job to a queue of the other printer.

17. The computer readable medium of claim 15, wherein the method further comprises:
identifying each printer managed by a print server that has a configuration that can handle the print setting; and
providing information identifying each of the managed printers that can handle the print setting.

18. The computer readable medium of claim 17, wherein the method further comprises:
presenting the information identifying each of the managed printers that can handle the print setting to a user at a display device.

19. The computer readable medium of claim 15, wherein:
the print setting comprises at least one of a customer name of the print job or an output tray of the print job.

20. The computer readable medium of claim 15, wherein the method further comprises:
receiving input selecting the other printer;
responsive to receiving the input, identifying available locations in a queue for the other printer where the other printer can handle the print setting;
providing information identifying the available locations in the queue for the other printer; and
moving the print job to an available location in the queue for the other printer.

* * * * *